United States Patent
Jacobson

(10) Patent No.: US 7,726,065 B2
(45) Date of Patent: Jun. 1, 2010

(54) DEVICE AND METHOD FOR REMOVING PESTS FROM A SURFACE

(76) Inventor: Melvin Lee Jacobson, 14831 Walker Pl., Minnetonka, MN (US) 55345

( * ) Notice: Subject to any disclaimer, the term of this patent is extended or adjusted under 35 U.S.C. 154(b) by 0 days.

(21) Appl. No.: 11/728,651

(22) Filed: Mar. 27, 2007

(65) Prior Publication Data

US 2007/0169402 A1  Jul. 26, 2007

Related U.S. Application Data

(62) Division of application No. 10/764,224, filed on Jan. 22, 2004, now Pat. No. 7,210,265.

(60) Provisional application No. 60/442,318, filed on Jan. 24, 2003.

(51) Int. Cl.
*A01M 1/14* (2006.01)
(52) U.S. Cl. .......................... 43/114; 43/136
(58) Field of Classification Search ........... 43/114–116, 43/136, 137
See application file for complete search history.

(56) References Cited

U.S. PATENT DOCUMENTS

| | | | |
|---|---|---|---|
| 1,780,407 A | | 11/1930 | Smith |
| 2,264,875 A | * | 12/1941 | Greuling ...................... 43/114 |
| 2,315,772 A | | 4/1943 | Closs |
| 2,437,447 A | | 3/1948 | Tarbell |
| 3,816,956 A | * | 6/1974 | Sekula .......................... 43/114 |
| 4,048,747 A | | 9/1977 | Shanahan et al. |
| 4,213,460 A | | 7/1980 | Weiner |
| 4,218,991 A | | 8/1980 | Cole |
| 4,224,901 A | | 9/1980 | Carey, Jr. |
| 4,350,122 A | | 9/1982 | Shotwell |
| 4,748,767 A | * | 6/1988 | Sandels ..................... 43/132.1 |
| 4,787,171 A | * | 11/1988 | Dagenais ...................... 43/137 |
| 4,976,718 A | | 12/1990 | Daniell |
| 4,979,771 A | | 12/1990 | Childs, III |
| 5,002,323 A | | 3/1991 | Idsund |
| 5,003,635 A | | 4/1991 | Peterson |
| 5,078,729 A | | 1/1992 | Eichhorn |
| 5,155,950 A | * | 10/1992 | Burgeson ...................... 43/114 |
| 5,165,199 A | * | 11/1992 | Tallon .......................... 43/124 |
| 5,253,448 A | * | 10/1993 | Byom .......................... 43/114 |
| 5,276,306 A | | 1/1994 | Huffman |
| 5,634,293 A | * | 6/1997 | Mike et al. .................... 43/136 |
| 5,914,062 A | | 6/1999 | von der Heyde |
| 6,044,584 A | | 4/2000 | Lynn |
| 6,067,746 A | | 5/2000 | Kistner et al. |
| 6,179,847 B1 | | 1/2001 | Possum |
| 6,185,862 B1 | * | 2/2001 | Nelson ......................... 43/136 |
| 6,353,939 B1 | | 3/2002 | Arber |

(Continued)

OTHER PUBLICATIONS

Abstract for Needham, GR, "Evaluation of five popular methods for tick removal", *Pediatrics* 1985 75:997-1002.

*Primary Examiner*—Darren W Ark
(74) *Attorney, Agent, or Firm*—Kinney & Lange, P.A.

(57) ABSTRACT

The present invention provides a pest removal device for removing a pest from a surface and a method of using the pest removal device. The pest removal device comprises an engagement side covered by an adhesive layer, a backing side positioned opposite the engagement side, a single release tab covered with a non-adhesive layer extending from the pest removal device for removing the engagement side from the surface.

14 Claims, 4 Drawing Sheets

U.S. PATENT DOCUMENTS

| | | | |
|---|---|---|---|
| 6,651,379 B1 * | 11/2003 | Nelson | 43/136 |
| 6,718,686 B2 * | 4/2004 | Marsh et al. | 43/114 |
| 6,898,898 B1 * | 5/2005 | Cohen et al. | 43/132.1 |
| 7,210,265 B2 * | 5/2007 | Jacobson | 43/114 |
| 7,430,830 B1 * | 10/2008 | Rosa | 43/136 |
| 7,469,501 B1 * | 12/2008 | Blum | 43/136 |
| 2002/0076427 A1 | 6/2002 | Hurwitz | |
| 2002/0112395 A1 * | 8/2002 | Marsh et al. | 43/114 |
| 2002/0124457 A1 * | 9/2002 | Cosenza | 43/114 |
| 2004/0200130 A1 * | 10/2004 | Klein | 43/114 |
| 2004/0216367 A1 * | 11/2004 | Klein | 43/114 |
| 2005/0235555 A1 * | 10/2005 | Hurwitz | 43/114 |

* cited by examiner

DEVICE AND METHOD FOR REMOVING PESTS FROM A SURFACE

CROSS-REFERENCE TO RELATED APPLICATION(S)

This application is a division of U.S. application Ser. No. 10/764,224 entitled "DEVICE AND METHOD FOR REMOVING PESTS FROM A SURFACE", filed on Jan. 22, 2004, which claims the benefit of Provisional Application No. 60/442,318, which was filed on Jan. 24, 2003.

BACKGROUND OF THE INVENTION

This invention generally relates to a device and method for removing pests from a surface. In particular, this invention relates to an adhesive sheet that is positioned over a pest to trap and remove the pest from the surface.

Pests like spiders, small insects, and rodents can spread disease. Ticks in particular may carry Lyme disease, and when they burrow into the host's skin may infect the host. To prevent the transmittal of disease or irritation which may occur from having an insect on the host's skin, the insect must be removed.

Tweezers and forceps have been used to remove burrowed insects from the skin of the host. A problem with using this type of removal device is that if the insect has attached itself to the host, then a portion of the insect may break off and remain at the burrow site when removing the insect. Materials remaining in the skin can lead to discomfort and infection.

Adhesive tapes and rollers have been used as a method of removing insects from a surface like skin. A problem with using adhesive tapes as a removal device is that once the tape has been applied to the surface, the tape is difficult remove. The tape is flat against the surface without an exposed edge for grabbing.

A problem with using adhesive rollers as a removal device is that the rigid roller may crush the insect. Another problem is that the roller passes over the insect too quickly. The roller pulls the insect off the surface without irritating the insect. Irritating the insect first causes it to unhook or release from the surface. Removing the insect prior to it releasing properly may result in a portion of the insect breaking off and remaining at the burrow site.

Many pests can be difficult to catch because they move too quickly or can get into areas that are difficult to reach. Devices like fly swatters can be used to strike and kill pests, but once the pest is struck, the force of the strike may cause the pest to be lost.

There is a need for a device to safely and effectively capture and immobilize pests while securing the pest to the capturing surface and where the capturing device can be easily manipulated by a user. There is a need for a device to cause a burrowed pest to release from the surface so that the pest can be entirely removed and examined for disease potential.

BRIEF SUMMARY OF THE INVENTION

The present invention relates to a method of removing a pest that resides on a body surface of an animal or a human using a pest removal device. The method includes adhering the pest removal device to the pest and a surrounding body surface such that the pest removal device conforms to the body surface and completely surrounds and encloses the pest. The pest removal device is maintained on the pest and the surrounding body surface for at lest three minutes, thereby causing the pest to release itself from the body surface. The pest removal device is peeled off of the body surface with the pest secured to the pest removal device.

While the above-identified drawings and figures set forth one embodiment of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principles of this invention. The figures may not be drawn to scale. Like reference numbers have been used throughout the figures to denote like parts.

DETAILED DESCRIPTION

Figure 1:
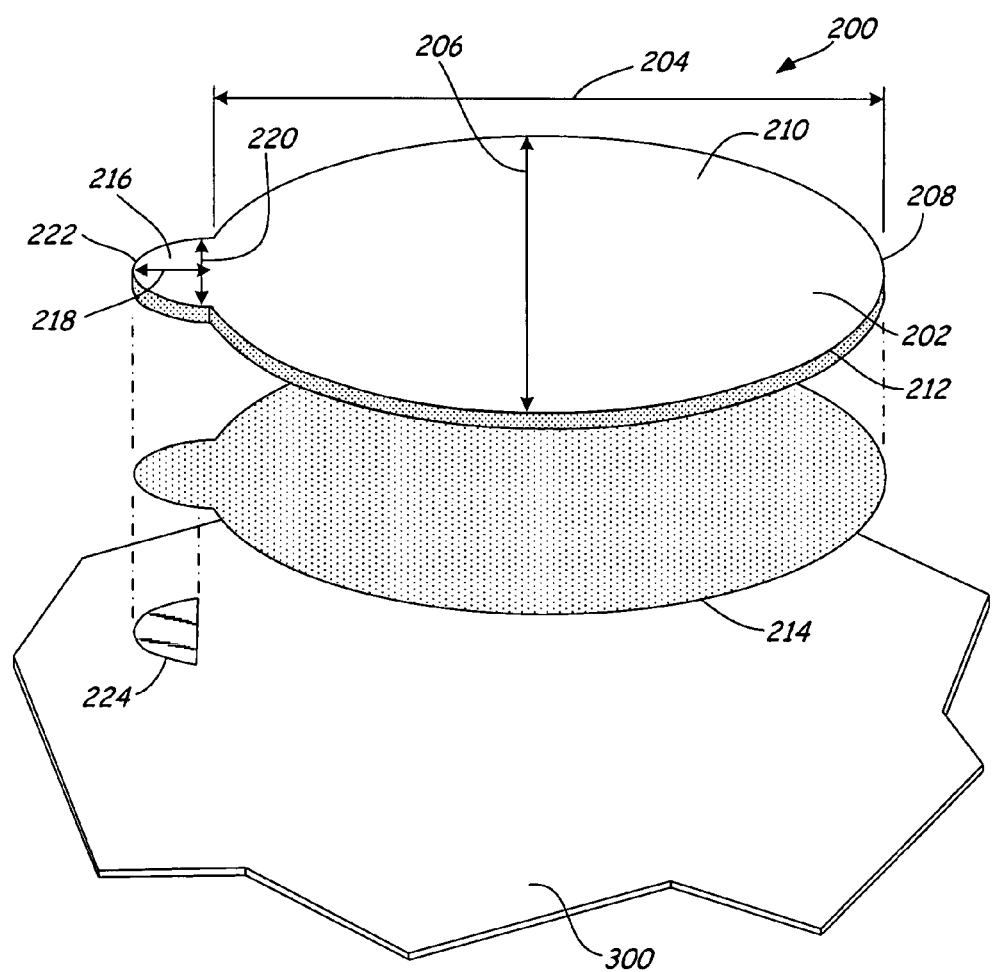
FIG. 1 is an exploded perspective view of one embodiment of a pest removal device.

FIG. 1 is an exploded perspective view of one embodiment of a pest removal device. The pest removal device 200 has a main body 202 with a main body length 204, width 206, and perimeter 208. In this embodiment the length 204 and width 206 are equal and define a diameter of a circular perimeter 208. The main body may be rigid or flexible. In one embodiment, the main body is constructed of a flexible, resilient foam.

The main body 202 has a backing side 210 and an engagement side 212 that is opposite the backing side 210. The engagement side 212 is coated with an adhesive layer 214. In this embodiment, the adhesive layer 214 covers the entire engagement side 212. The adhesive layer 214 may be penetrated or encapsulated with a pesticide, antiseptic, or medication such as benadryl. In some embodiments, the backing side 210 may be covered with an adhesive layer as well to create a pest removal device with tackiness on both the engagement side 212 and the backing side 210. (See FIG. 6). The pest removal device 200 can be removably stored on a storage liner 300.

The pest removal device 200 is shown to be generally flat and circular shaped but may be of any size or shape that is appropriate for the particular application. In one embodiment, the pest removal device 200 that would be appropriate for use in removing small pests like insects, ticks, and spiders has a diameter of one inch.

To assist in removing the pest removal device 200 from the storage liner 300 or a contact surface is a release tab 216. The release tab 216 has a release tab length 218 that extends parallel to the main body length 204, and a width 220 that extends parallel to the main body width 206. The release tab 216 in this embodiment has a length 218 and width 220 that are equal and define a radius of a partial circle perimeter 222. The release tab length 218 is less than the main body length 204 and the release tab width 220 is less than the main body width 206. Therefore, the release tab 216 is a projection that has a smaller size than the main body size. The release tab 216 in FIG. 1 extends from the main body perimeter 208. The release tab 216 is covered with a tab liner 224, so that the adhesive layer 214 on the release tab 216 does not stick to a user's finger during operation. The release tab 216 may be of a rigid or flexible material and be of any size or shape that is appropriate for the particular application.

Figure 2:
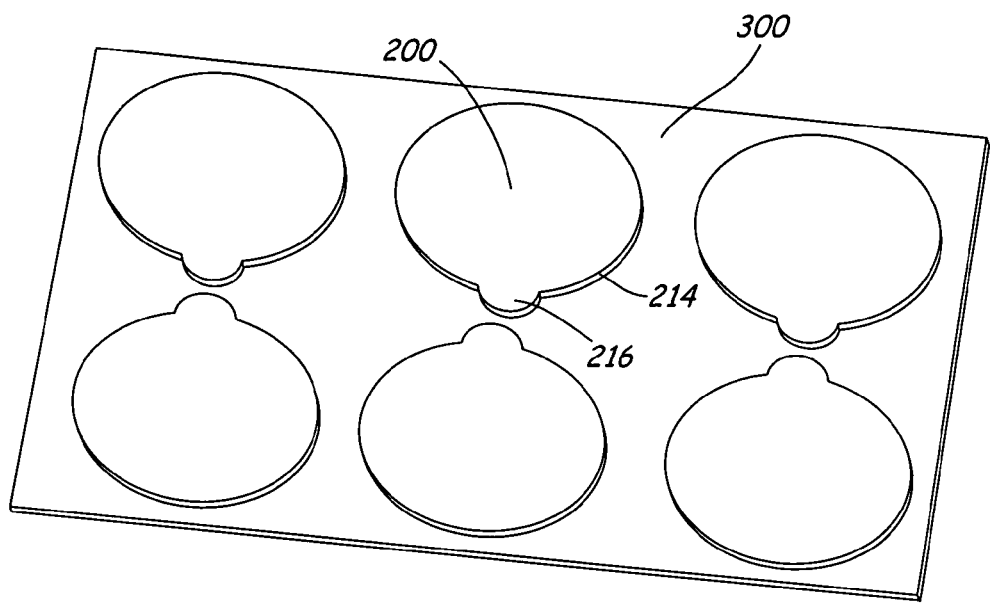
FIG. 2 is a perspective view of a plurality of pest removal devices.

FIG. 2 is a perspective view of a plurality of pest removal devices. A plurality of pest removal devices 200 are attached to a storing liner 300 that in this embodiment is a rectangular sheet. The adhesive layer 214 of the pest removal device 200 attaches to the storing liner 300. The release tab 216 being covered with a tab liner 224 is not attached to the storing liner 300 so that the release tab 216 can be easily grabbed to remove the pest removal device 200. The storing liner 300 may have a glossy surface or be coated with a release agent so that the adhesive layer 214 of the pest removal device 200 can be easily removed without damaging the tackiness of the adhesive layer 214 of pest removal device 200 or damaging the storing liner 300. The storing liner 300 may be any size or shape so as to effectively store a plurality of pest removal devices 200.

Figure 3:
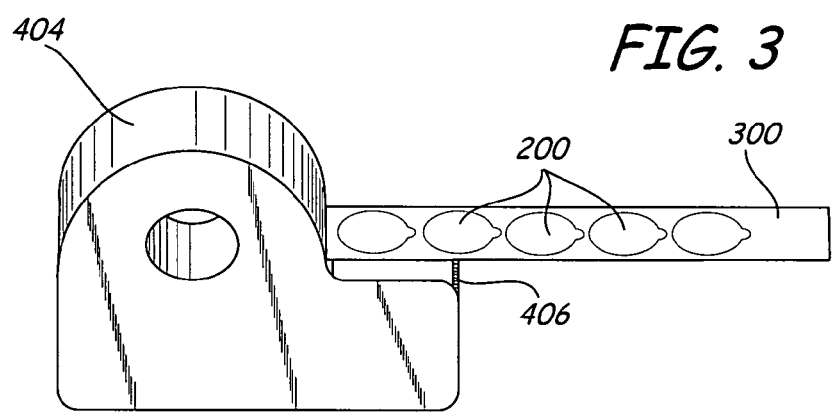
FIG. 3 is a perspective view of a spool of pest removal devices and a dispenser.

FIG. 3 is a perspective view of a spool of pest removal devices on a dispenser. A plurality of pest removal devices 200 are arranged in a linear fashion on a storing liner 300. The adhesive layer 214 of the pest removal device engages with the surface of the storing liner 300. The storing liner 300 is then spooled and placed in a dispenser 404. The dispenser 404 may have a serrated edge 406 for tearing the storing liner 300 so that the pest removal devices 200 attached to the storing liner 300 can be removed.

An exemplary size of a pest removal devices 200 useful in trapping small insects, spiders, and other small pests has a main body 202 with a diameter of one inch, a release tab 216 with a radius of 0.125 inches. When placed on the sheet, the main bodies 202 are 0.250 inches apart and the release tabs 216 are 0.125 inches apart.

An exemplary material useful in making the pest removal device is a tape available from 3M Health Care of St. Paul, Minn. as 3M 8791 Foam Medical Tape. For the tab liner 224, a polyester liner is available from Rayven, Inc. of St. Paul, Minn. Foam medical tape available from 3M is constructed of a polyvinyl chloride foam, coated on one side with a hypoallergenic pressure-sensitive acrylate adhesive and supplied on a paper liner. The foam tape, without the paper liner, has a caliper of approximately 22.5 mils. The foam tape has an adhesion to steel minimum of approximately 227 g/25 mm. The paper liner has a caliper of approximately 4 mils. The medical tape is transferred onto a finished product liner or storage liner 300. The finished product liner is coated with a release agent, such as silicone, so that the adhesive layer of the medical tape releases from the surface. The finished product liner can be a material such as a 78 pound liner with a caliper from 4.5 to 7 mils. The tab liner 224 covering the release tab 216 can be a polyester liner adhered to the adhesive layer of the medical tape having a caliper of approximately 1.5 mils. Other sizes and materials for construction of the pest removal devices are within the scope of this invention.

The pest removal devices 200 attached to a storing liner 300 may then be boxed or packaged in a plastic resealable container. The container can be easily stored in a camper, in a car, or in a kitchen drawer so that the pest removal devices 200 are easily accessible.

Figure 4:
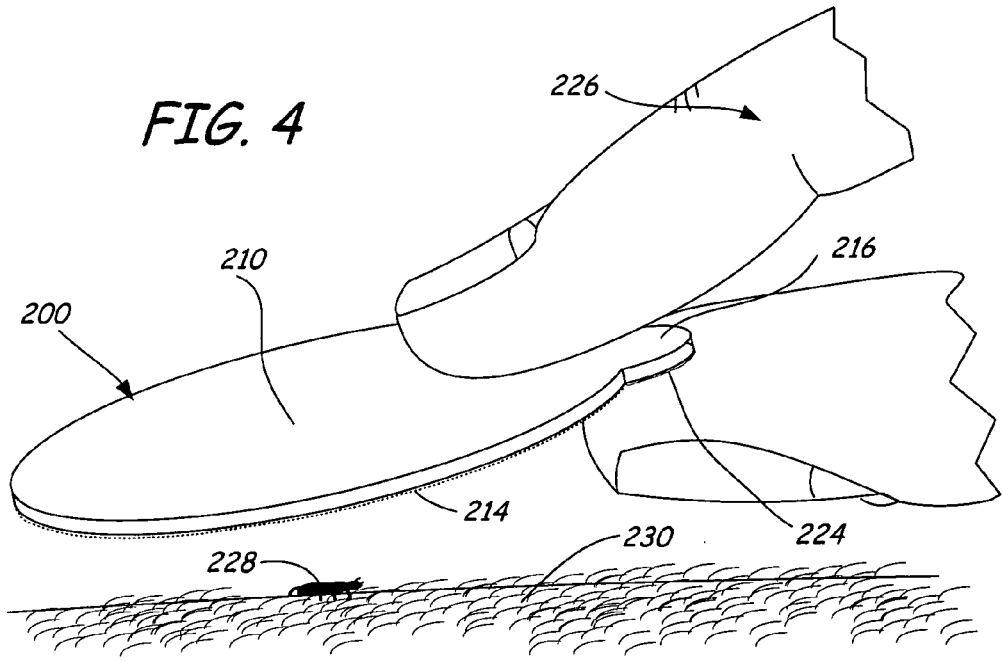
FIG. 4 is a perspective view of a pest removal device being applied over a pest.
Figure 4A:
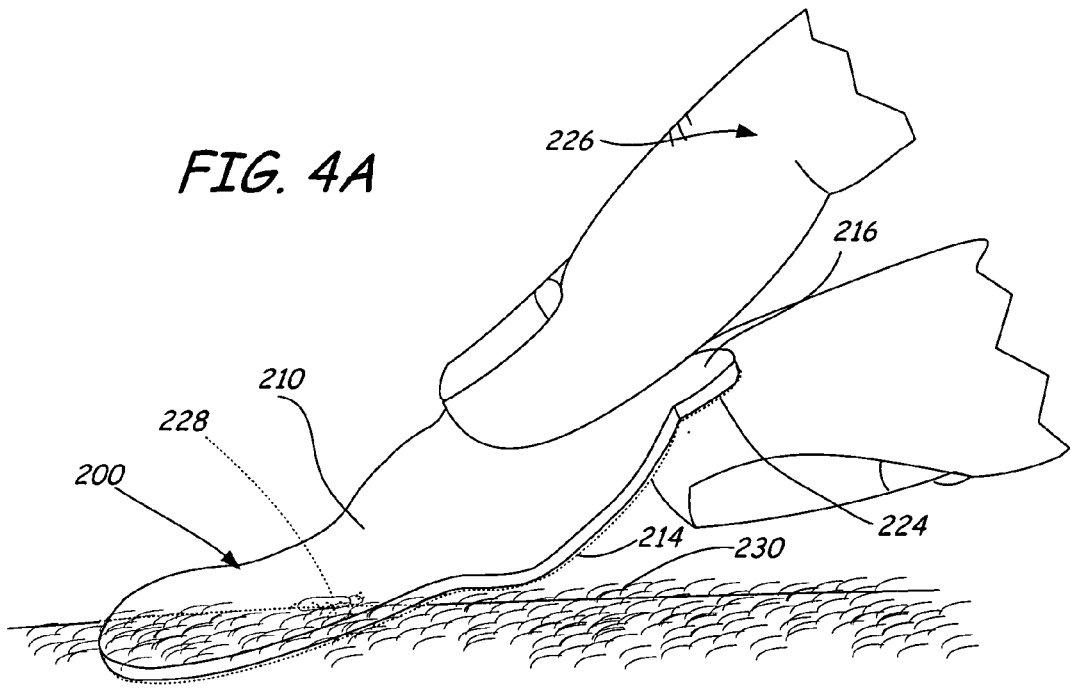
FIG. 4A is a perspective view of the pest removal device in FIG. 4 as the device is being attached to the pest and the surrounding surface.

FIGS. 4 and 4A are perspective views of a pest removal device being applied over a pest and a surrounding surface. As shown in FIG. 4, a user 226 holds the pest removal device 200 by holding the tab liner 224 of the release tab 216 and the backing side 210. The user 226 then positions the adhesive side 214 over the pest 228 (in this case a tick). As shown in FIG. 4A, the adhesive side 214 sticks to the pest 228 and a surrounding surface 230 on which the pest 228 is touching. The surrounding surface 230 may be human skin, animal skin, clothing, a wall, or other type of surface pests dwell. If the adhesive side 214 is penetrated or imbedded with an antiseptic solution, the pest 228 may become irritated. This irritation may cause the pest 228 imbedded in the surrounding surface 230 to detach. Additionally, if the pest removal 200 device is constructed of a resilient foam material, it compresses and surrounds the pest 228 thereby suffocating the pest 228 causing the pest to release from the surrounding surface 230. After a predetermined period of time, the user 226 pulls on the release tab 216 and removes the pest removal device 200 from the surrounding surface 230 with the pest attached to the device 200. To sufficiently irritate or suffocate the pest, the pest removal device 200 should be positioned over the pest 228 for a sufficient amount of time. Generally, three to ten minutes is sufficient and up to thirty minutes for deeply imbedded pests. The pest removal device 200 is then removed. Because the pest 228 is attached to the adhesive side 214, the pest 228 is unable to escape. If the antiseptic is alcohol based, it also helps to clean a wound left by the pest 228 on the surrounding surface 214.

Figure 5:
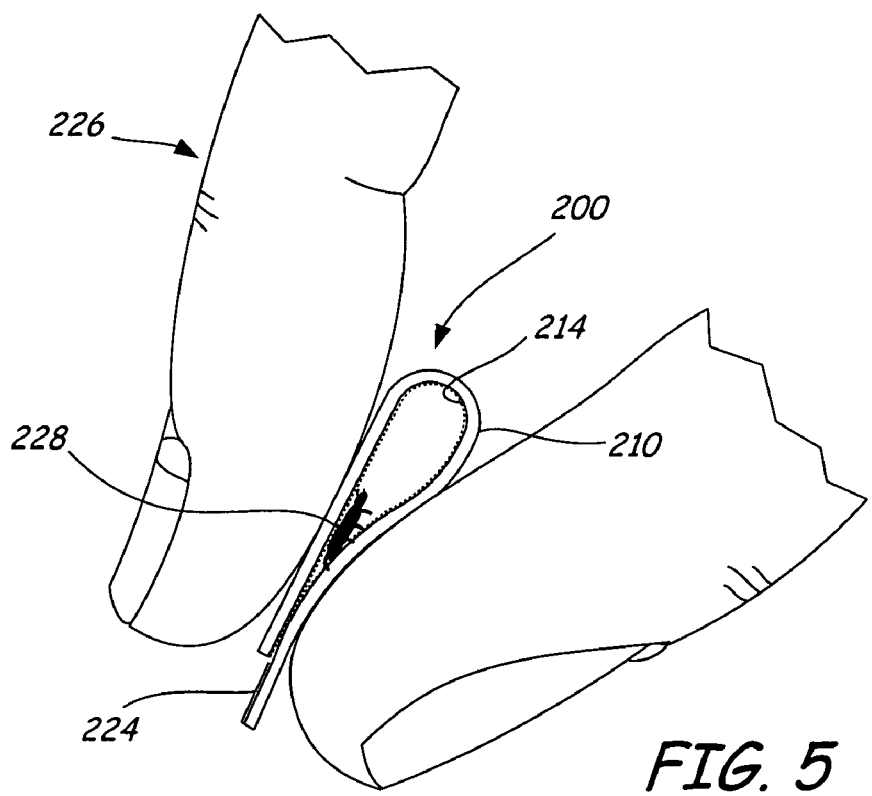
FIG. 5 is a perspective view of a folded pest removal device.

FIG. 5 is a perspective view of a folded pest removal device 200. The pest removal device 200 with the pest 228 attached to the adhesive side 214 has been removed from the surface 230. The user 226 can fold the backing side 210 so that the pest 228 becomes trapped in the adhesive side 214. After the pest 228 is trapped, the pest removal device 200 can be discarded or sent to a laboratory where the pest 228 can be analyzed for disease.

Figure 6:
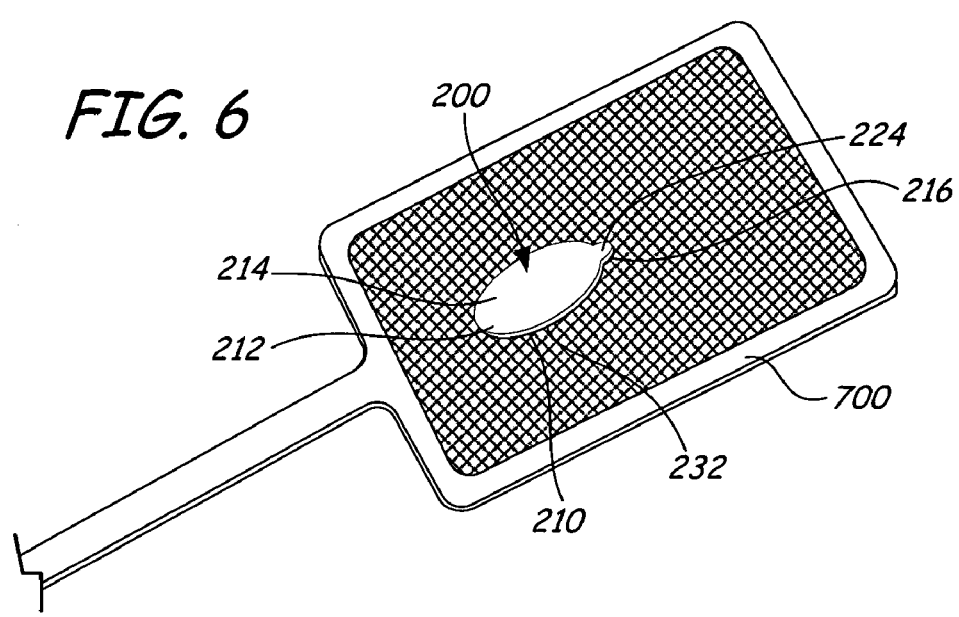
FIG. 6 is a perspective view of a pest removal device attached to an extension tool.

FIG. 6 is a perspective view of a pest removal device attached to an extension tool. In this embodiment, the pest removal device 200 has an adhesive layer 232 covering at least a portion of the backing side 210 as well as an adhesive layer 214 on the engagement surface 212. The backing adhesive layer 232 allows the pest removal device 200 to be securely attached to a tool 700. The tool 700, such as a fly swatter, broom, or wooden pole can allow a user 226 to catch a pest 228 located out of the user's reach. The engagement surface 204 is exposed and is the surface that traps the pest 228. To remove the pest removal device 200, the user 226 pulls on the release tab 216. In this embodiment, both sides of the release tab 216 would be covered with a tab liner 224.

The pest removal device can be used to remove a variety of pests from various surfaces. An appropriate sized device may be used to remove small and large insects, spiders, and rodents from humans, animals, or other various surfaces. The pest removal device is useful for removing imbedded ticks from skin of a human or animal. A large removal device may be used to remove a rodent caught in a trap so that the rodent can be captured without a user having to touch the rodent with his or her hands.

A pesticide, antiseptic, or odorous material may be incorporated into the adhesive layer to cause a burrowed pest to release from a surface or to kill or immobilize the pest prior to removal. For pests burrowed in a surface like skin, an antiseptic can be useful in assisting with cleaning the surface to prevent infection.

A pest removal device constructed of foam allows the user to press the pest removal device on the pest and the surrounding material. The foam is compressible so that when the user presses to enclose the surrounding surface, the pest is not necessarily crushed but the foam is depressed. This may prevent the transfer of fluids from the pest to the surrounding surface.

Although the present invention has been described with reference to preferred embodiments, workers skilled in the art will recognize that changes may be made in form and detail without departing from the spirit and scope of the invention.

What is claimed is:

1. A method of removing a pest that resides on a body surface of an animal or a human, the method comprising:

adhering an adhesive layer located on a circular main body having a diameter of approximately 1 inch of a pest removal device to the pest and a surrounding body surface thereby releasably attaching the adhesive layer to both the pest and the surrounding body surface, such that the pest removal device, formed of a flexible, resilient polyvinyl chloride foam material having a caliper of approximately 20 to 25 mils conforms to the body surface and completely surrounds, contacts, and encloses the pest to suffocate the pest, maintaining the pest removal device in contact with the pest and the surrounding body surface for at least three minutes to cause the pest to release itself from the body surface; and peeling a release tab having a radius of approximately 0.125 inches and extending from the main body of the pest removal device off of the body surface with the pest secured to the adhesive layer of the pest removal device.

2. The method of claim 1, wherein the adhesive layer is penetrated with an antiseptic.

3. The method of claim 1, wherein the pest removal device includes an antiseptic solution, and maintaining the pest removal device on the pest and the surrounding body surface for at least three minutes results in the antiseptic solution irritating the pest, thereby causing the pest to release itself from the body surface.

4. The method of claim 1, wherein maintaining the pest removal device in contact with the pest and the surrounding body surface for at least three minutes includes suffocating the pest, thereby causing the pest to release itself from the body surface.

5. The method of claim 1, wherein the pest removal device is maintained on the surrounding body surface for up to thirty minutes.

6. A method of removing a pest from a body surface of an animal or a human, the method comprising:

providing a pest removal device comprising:

a circular main portion having a diameter of approximately 1 inch, an engagement side covered with an adhesive layer and a backing side positioned opposite the engagement side, the main portion formed of a flexible, resilient polyvinyl chloride foam material having a caliper of approximately 20 to 25 mils; and a release tab having a radius of approximately 0.125 inches extending from the main portion;

attaching the engagement side of the main portion to the pest and to the body surface thereby releasably attaching the adhesive layer to both the pest and the surrounding body surface, such that the pest removal device conforms to the body surface and completely surrounds, contacts, and encloses the pest for a time sufficient to suffocate and cause the pest to release itself from the surface; and peeling the main portion of the pest removal device off of the body surface with the pest attached to the engagement side of the main portion by pulling on the release tab.

7. The method of claim 6, wherein peeling the main portion of the pest removal device off of the body surface includes starting to peel off the pest removal device at a portion of the device located closest to the release tab.

8. The method of claim 6, further comprising:

providing a storing liner to removably secure the engagement side of the main portion of the pest removal device prior to attaching the engagement side to the body surface.

9. The method of claim 6, further comprising:

folding the pest removal device after peeling the main portion off of the body surface to trap the pest.

10. A method of removing a pest embedded in a body surface of an animal or a human, the method comprising:

removing a pest removal device from a storing liner to which the pest removal device is removably attached, wherein the pest removal device includes a circular main body having a diameter of approximately 1 inch formed of a flexible, resilient polyvinyl chloride foam material having a caliper of approximately 20 to 25 mils and an adhesive layer on one side of the main body;

positioning the adhesive layer of the main body of the pest removal device on the pest and a surrounding surface of an animal or a human where the pest resides and releasably attaching the adhesive layer to both the pest and the surrounding surface of the animal or human, such that the pest removal device is essentially flush with the surrounding surface and completely surrounds, contacts, and encloses the pest to suffocate the pest;

maintaining the main body of the pest removal device on the pest and the surrounding surface for at least three minutes in order to suffocate the pest and cause the pest to release itself from the surface; and pulling a release tab having a radius of approximately 0.125 inches extending from the main body of the pest removal device to peel the main body of the device from the surface with the pest attached to the pest removal device.

11. The method of claim 10, wherein pulling the release tab extending from the main body of the pest removal device to peel the main body of the device from the surface includes starting to peel off the main body of the device at a portion of the main body located closest to the release tab and finishing with a portion of the main body located opposite the release tab.

12. The method of claim 10, further comprising:

folding the main body of the pest removal device to trap the pest after peeling the main body of the device from the surface.

13. The method of claim 10, further comprising:

disposing of the pest removal device.

14. The method of claim 10, further comprising:

saving the pest attached to the pest removal device; and analyzing the pest for disease.

* * * * *

UNITED STATES PATENT AND TRADEMARK OFFICE
CERTIFICATE OF CORRECTION

| | | |
|---|---|---|
| PATENT NO. | : 7,726,065 B2 | Page 1 of 1 |
| APPLICATION NO. | : 11/728651 | |
| DATED | : June 1, 2010 | |
| INVENTOR(S) | : Melvin Lee Jacobson | |

It is certified that error appears in the above-identified patent and that said Letters Patent is hereby corrected as shown below:

Col. 5, Line 60, Claim 6
Delete "surrounding"

Signed and Sealed this
Fifth Day of July, 2011

David J. Kappos
*Director of the United States Patent and Trademark Office*